United States Patent [19]

Wallnberger et al.

[11] Patent Number: 5,473,265
[45] Date of Patent: Dec. 5, 1995

[54] CIRCUIT CONFIGURATION FOR THE GENERATION OF A LINE TERMINATING IMPEDANCE

[75] Inventors: Gerald Wallnberger, Villach; Herbert Zojer, Koetschach, both of Austria

[73] Assignee: Siemens Aktiengesellschaft, Munich, Germany

[21] Appl. No.: 300,433

[22] Filed: Sep. 2, 1994

[30] Foreign Application Priority Data

Sep. 2, 1993 [DE] Germany .......................... 93 13 253 U
Oct. 19, 1993 [DE] Germany .......................... 93 15 933 U

[51] Int. Cl.$^6$ ............................................. H03K 19/0175
[52] U.S. Cl. ............................ 326/30; 379/398; 379/399
[58] Field of Search ................................ 326/30; 379/398, 379/399, 402, 404

[56] References Cited

U.S. PATENT DOCUMENTS

| | | | |
|---|---|---|---|
| 5,034,978 | 7/1991 | Nguyen | 379/402 |
| 5,274,671 | 12/1993 | Johnson | 326/30 |
| 5,287,406 | 2/1994 | Kakuishi | 379/404 |
| 5,295,186 | 3/1994 | Okamoto | 379/398 |
| 5,305,378 | 4/1994 | Svensson | 379/399 |
| 5,402,485 | 3/1995 | Takato | 379/402 |

FOREIGN PATENT DOCUMENTS

| | | |
|---|---|---|
| 0163298 | 12/1985 | European Pat. Off. . |
| 87/03440 | 6/1987 | WIPO . |
| 88/10539 | 12/1988 | WIPO . |

Primary Examiner—Edward P. Westin
Assistant Examiner—Andrew Sanders
Attorney, Agent, or Firm—Herbert L. Lerner; Laurence A. Greenberg

[57] ABSTRACT

A circuit configuration for the generation of a line terminating impedance includes a two-wire to four-wire converter having a transfer function. An analog impedance network has a transfer function and input and output sides being connected through the two-wire to four-wire converter to a line. A digital impedance network has a transfer function and is connected in parallel with the analog impedance network through an analog-digital converter unit and a digital-analog converter unit. A real portion of a sum of the transfer function of the analog impedance network and a product of the transfer functions of the analog-digital converter unit, the digital impedance network and the digital-analog converter unit, multiplied by the transfer function of the two-wire to four-wire converter, is greater than −1.

1 Claim, 1 Drawing Sheet

CIRCUIT CONFIGURATION FOR THE GENERATION OF A LINE TERMINATING IMPEDANCE

BACKGROUND OF THE INVENTION

FIELD OF THE INVENTION

The invention relates to a circuit configuration for the generation of a line terminating impedance.

In telecommunications, terminals are typically connected to special interface circuits through analog subscriber lines. Among other things, such an interface circuit, which is also known as a Subscriber Line Interface Circuit (SLIC), provides the subscriber line with a line voltage and a line current at a certain specified line terminating impedance. This line terminating impedance varies from country to country and thus should be adjustable, preferably in a simple manner.

If the line terminating impedance is realized using analog circuit technology, there are practically no stability problems, but changing the impedance is difficult or only possible with very complex circuitry. On the other hand, a purely digital solution would be the most favorable in terms of easy modification of the impedance because of its programmability, but a purely digital solution is not possible for reasons of stability. A final option is a partly analog, partly digital realization of line terminating impedance. Due to the complexity of the transfer function of such a system, in particular at a higher order, stabilization is very difficult.

SUMMARY OF THE INVENTION

It is accordingly an object of the invention to provide a circuit configuration for the generation of a line terminating impedance, which overcomes the hereinafore-mentioned disadvantages of the heretofore-known devices of this general type, which has great stability and which requires simple circuit technology.

With the foregoing and other objects in view there is provided, in accordance with the invention, a circuit configuration for the generation of a line terminating impedance, comprising a line; a two-wire to four-wire converter having a transfer function and being connected to the line; an analog impedance network having a transfer function and having input and output sides connected to the two-wire to four-wire converter; an analog-digital converter unit having a transfer function; a digital-analog converter unit having a transfer function; and a digital impedance network having a transfer function and being connected in parallel with the analog impedance network through the analog-digital converter unit and the digital-analog converter unit; and a real portion of a sum of the transfer function of the analog impedance network and a product of the transfer functions of the analog-digital converter unit, the digital impedance network and the digital-analog converter unit, multiplied by the transfer function of the two-wire to four-wire converter, being greater than −1.

Other features which are considered as characteristic for the invention are set forth in the appended claims.

Although the invention is illustrated and described herein as embodied in a circuit configuration for the generation of a line terminating impedance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
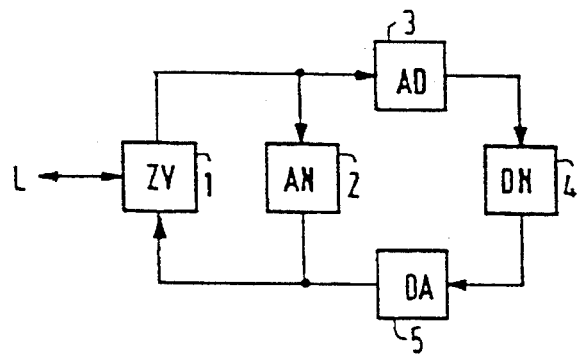
FIG. 1 is a block diagram of a general embodiment of a circuit configuration according to the invention.

Referring now to the figures of the drawing in detail and first, particularly, to FIG. 1 thereof, there is seen a circuit configuration in which a line L is connected to a two-wire to four-wire converter 1, which inputs signals arriving from the line L into a reception path and feeds signals arriving on a transmission path into the line L. Inserted between the reception branch and the transmission branch is an analog network 2, which in turn is connected in parallel to a digital network 4 by means of an intermediate analog-digital converter 3 and a digital-analog converter 5. In addition to an analog-digital converter or a digital-analog converter, the analog-digital converter unit 3 and the digital-analog converter unit 5 include analog and possibly digital band limiting filters.

The parallel connection of analog and digital loops, and thus the addition of the transfer functions of the analog and digital loops, provide a dominant conjugated complex null digit pair in the frequency range, the position of which pair is a function only of the ratio of the transfer function of the analog network to that of the digital network and which pair is the dominant factor in determining the stability of the circuit. Thus, the stability of the circuit can be easily optimized by using the ratio of the transfer function of the analog network to that of the digital network. Since the currently accepted stability criterion for subscriber lines dictates that the real portion of the line terminating impedance must be positive, the stability criterion for the circuit according to FIG. 1 is:

$$Re(TF(AN+AD \times DN \times DA)) > -1.$$

TF, AN, AD, DN and DA stand for the transfer functions of the two-wire to four-wire converter 1, the analog network 2, the analog-digital converter unit 3, the digital network 4 and the digital-analog converter unit 5.

Figure 2:
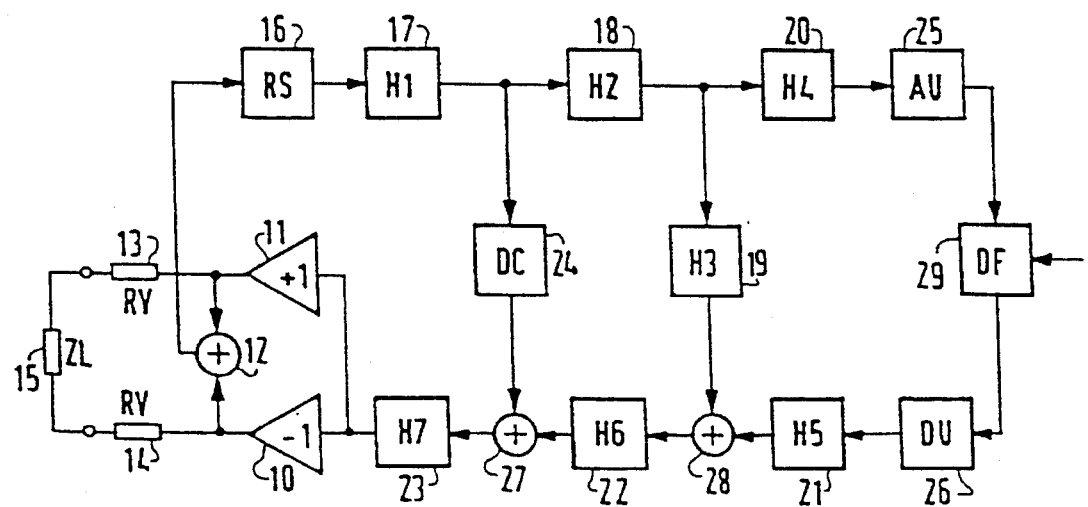
FIG. 2 is a schematic and block diagram of a special embodiment of the circuit configuration according to FIG. 1.

An additional, special embodiment of a circuit configuration according to the invention is shown in FIG. 2 and includes a two-wire to four-wire converter, an analog network, an analog-digital converter unit, a digital network and a digital-analog converter unit, as well as a DC supply unit. The two-wire to four-wire converter includes two amplifiers 10 and 11 having respective amplifications of −1 and +1 and having inputs which are interconnected and coupled with the transmission path. Outputs of the two amplifiers 10 and 11 are each connected to one respective input of an adder circuit 12 and are also coupled through a respective resistor 13 or 14 with a value of RV to a line 15 which can be described by a line impedance ZL. An output of the adder circuit 12 is connected to an analog sub-network 16, which can be described by means of a transfer function RS and which has an output that represents the reception branch of the configuration. The transfer function of the two-wire to four-wire converter is therefore:

$$TF=RS/(2\times RV+ZL).$$

In the case of the embodiment according to FIG. 2, the analog network AN from FIG. 1 should be defined by means of the following transfer function:

$$AN=H1\times H7\ (DC+H2\times H3\times H6).$$

The analog-digital converter unit and the digital-analog converter unit should exhibit the following transfer functions:

$$AD=H1\times H2\times H4\times AU \text{ and}$$

$$DA=DU\times H5\times H6\times H7.$$

A digital filter 29 with a transfer function DF is provided as the digital network. Partial filters 17 through 23 form partial transfer functions H1 to H7. Reference symbols DC, AU and DU stand for a DC power supply 24, an analog-digital converter 25 and a digital-analog converter 26, respectively.

Since the partial transfer functions H1, H2, H6 and H7 are used in both the analog and digital loops, with the partial transfer functions H1 and H7 being used in both DC and AC in the analog loop, each of the partial transfer functions only has to be realized once with the appropriate circuit structure. In addition, the sub-networks 17, 18, 20, the analog-digital converter 25, the digital filter 29, the digital-analog converter 26 and the sub-networks 21 through 23 are connected in series between the receiving path and the transmission path of the two-wire to four-wire converter. The DC power supply 24 and the partial filter 19 are respectively connected to pick-ups between the sub-networks 17 and 18 and between the sub-networks 18 and 20. The DC power supply 24 and the partial filter 19 supply output signals which are input into the circuit at respective pick-ups between the partial filters H7 and H6 and between the partial filters H6 and H5, by interconnecting respective adder circuits 27 and 28. The following applies as a stability criterion:

$$RE((RS/(2RV+ZL))(H1\times H7)(DC+H2\times H6(H3+H4\times AU\times DF\times DU\times H5)))>1.$$

We claim:

1. A circuit configuration for the generation of a line terminating impedance, comprising:

a line;

a two-wire to four-wire converter having a transfer function and being connected to said line;

an analog impedance network having a transfer function and having input and output sides connected to said two-wire to four-wire converter;

an analog-digital converter unit having a transfer function;

a digital-analog converter unit having a transfer function; and a digital impedance network having a transfer function and being connected in parallel with said analog impedance network through said analog-digital converter unit and said digital-analog converter unit; and a real portion of a sum of the transfer function of said analog impedance network and a product of the transfer functions of said analog-digital converter unit, said digital impedance network and said digital-analog converter unit, multiplied by the transfer function of said two-wire to four-wire converter, being greater than −1.

* * * * *